Figure 1:
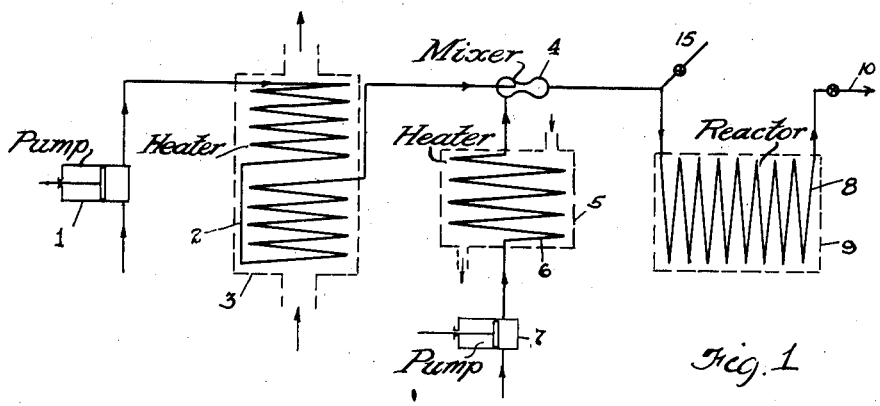

Aug. 29, 1933.                J. J. GREBE ET AL                 1,924,313
                          METHOD FOR MAKING PHENATES
                             Filed June 29, 1928

INVENTORS.
John J. Grebe and
Willard H. Dow
BY
Day, Oberlin & Day
ATTORNEYS.

Patented Aug. 29, 1933

1,924,313

UNITED STATES PATENT OFFICE 1,924,313

METHOD FOR MAKING PHENATES

John J. Grebe and Willard H. Dow, Midland, Mich., assignors to The Dow Chemical Company, Midland, Mich., a Corporation of Michigan Application June 29, 1928. Serial No. 289,200

9 Claims. (Cl. 260—154)

In the processing of liquid mixtures to carry out a chemical reaction taking place under conditions of high temperature and pressure, it has been the practice to heat the reacting mixture within a suitable container or autoclave by forcing heat from the outside through the walls thereof, and in large scale working particularly to pass a continuous stream of the reaction mixture through a tubular heating and reaction system in which the mixture is brought up to the desired temperature by forcing the necessary heat through the walls of the tubular container.

When operating in this manner, whether the heat head be high or low, the temperature of the source of heat will be higher than the temperature to be attained by the fluid in the system. This in itself gives rise to the problem of injury to the metallic apparatus, since variations in the efficiency of combustion, in the rate of heat losses and in furnace temperature, affect the temperature of the metal over a considerable range and tend to subject it to temperatures in excess of those at which it can be successfully maintained owing to weakening of corrosion from without or within.

We have discovered a method of heating applicable to a reaction mixture which eliminates to a large extent the difficulties encountered in past practice. Generally stated, this method consists in introducing the reaction materials into the pressure system in two or more separate portions, one suitable portion being heated in any suitable manner under pressure to a temperature above that desired for the reacting mixture and then being joined to the remaining constituents of the mixture with which it is mixed. Such remaining constituents may, if desired, be also preheated to a degree, but the excess heat carried by such first constituent, or portion of the reacting mixture, when given up to the mixture serves effectively to heat the entire mixture to the proper temperature for reaction. Where one ingredient of the reaction mixture is volatilizable, at least a portion of such ingredient may be separately heated and volatilized and also superheated before being added to the balance of the reaction mixture, or a component of the reaction mixture containing such ingredient may be heated and the volatilizable ingredient vaporized, such treatment to precede mixing of the reaction components.

To the accomplishment of the foregoing and related ends, the invention, then, consists of the steps hereinafter fully described and particularly pointed out in the claims, the annexed drawing and the following description setting forth in detail several modes of carrying out the invention, such disclosed modes illustrating, however, but several of the various ways in which the principle of the invention may be used.

In said annexed drawing:—

Figure 2:
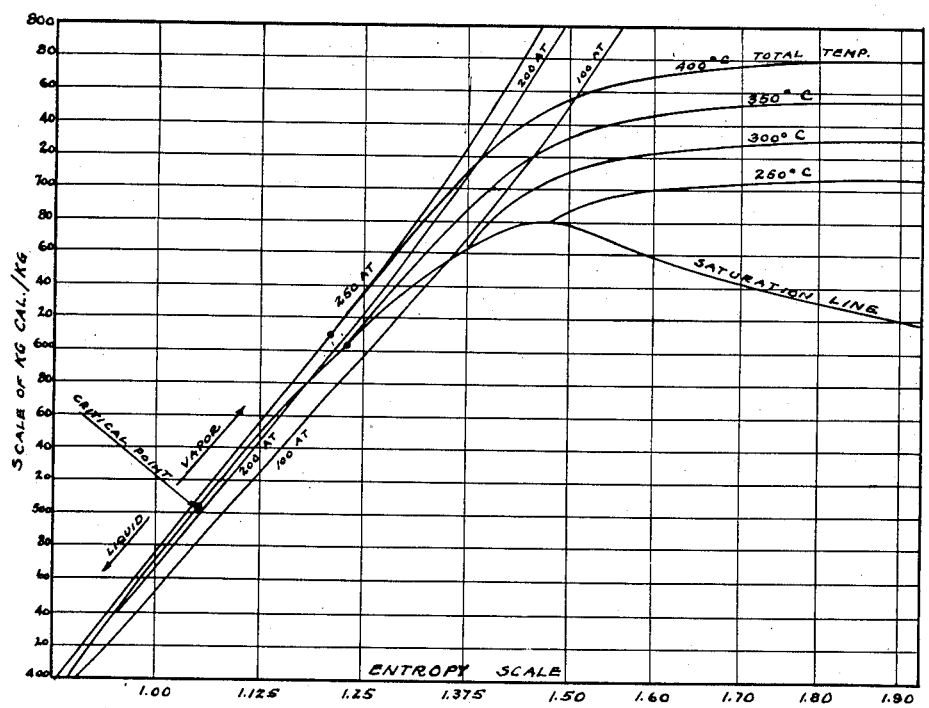

Fig. 1 shows in diagrammatic form one form of apparatus suitable for carrying out the present improved process; and Fig. 2 is a portion of a Mollier chart of steam showing the availability of the latter as a component in a reaction according to such process.

Referring more particularly to Fig. 1 of the drawing, pump 1 is used to deliver a predetermined portion of a volatilizable component of the reaction mixture, for example water, to a suitable heater, such as coil 2, installed in a heating furnace or chamber 3. Such heated component then passes to a mixer 4, shown as of the injector type, where it is thoroughly mixed with the remaining components of the reaction mixture, these being forwarded by a pump 7 through a preheater coil 6 which may be heated in any convenient manner. The reaction mixture having been thoroughly mixed and brought to the proper reaction temperature in mixer 4, then passes to a suitable reaction chamber such as coil 8 inclosed in a chamber 9, which is heat insulated, or otherwise arranged and constructed so that the temperature of the reaction mixture in coil 8 will not fall materially. The reacted mixture then passes out of reactor 8 through pipe 10 to suitable receivers and equipment (not shown) where the reaction products are separated in any satisfactory manner, such as by distillation.

Fig. 2 shows a few high pressure lines on a Mollier chart of steam, such lines illustrating in general that even though the heat of vaporization vanishes at the critical point, the specific heat of the fluid above the critical point is high enough to make possible the addition of considerably more heat to the fluid where it is available for heating a mixture to the desired reaction temperature.

When working with mixtures of alkaline solutions and chlorinated hydrocarbons at high pressures and temperatures, as for the pioduction of phenates, excessive temperatures to which the metallic apparatus is subjected result in local corrosion and solution of the metal and deposit of same as an oxide in the cooler part of the system, with the result that the vessel or tubing may soon be perforated in the hot portion or stopped up in the cooler portion of the system.

In general this is true in any process, either batch or continuous, where high temperatures and pressures are reached that involve conditions of metal attack.

Accordingly, when it is desired, for example, to react a fluid mixture containing water at a temperature corresponding to a reaction pressure of 1600 lbs. absolute, a marked advantage is obtained by separately heating and vaporizing enough of the water at a pressure in excess of 1600 lbs. absolute, for instance, 1700 lbs. absolute, so that when it is supplied to the remaining constituents of the reaction mixture which have been preheated to a lower temperature than that of reaction, it will bring the mixture, i. e., condensed vapor and preheated liquor, to the desired reaction temperature. By superheating the vapor so used before introduction into the system, the heating effect per unit weight thereof is raised and less of it is therefore required for producing a given temperature rise, considering the same preheat temperature as before. If, however, a lower preheat temperature is desired, it will only be necessary to furnish the additional heat by means of the superheated vapor.

If the above process is carried out in a continuous system, such as illustrated in Fig. 1, a controlled portion of the total water will be fed in regulated amount through coil 2 operated as a vaporizer to produce therein water vapor at the excess pressure, say 1700 lbs. absolute. The balance of the reaction mixture is then forced into the system through preheater 6 wherein it is heated to a temperature short of the final temperature desired, such temperature being one that can be practically and successfully attained in ordinary equipment utilizing a safe heat source, the temperature of which is commensurate with the temperature to be attained. The vapor and balance of the reaction mixture thereupon come together and mingle in the reactor 8 where the heat of vaporization and superheat of the water, and its sensible heat above the reaction temperature, are absorbed by the mixture, whereby the temperature is raised to the desired degree. In this manner it becomes unnecessary to drive heat into the reacting mixture through the metal wall of the reactor, or other part of the apparatus employed, and overheating of such metal is thereby avoided, together with the harmful consequences due to such overheating.

The foregoing procedure is particularly applicable to processes that have to be carried out at temperatures which are above the temperature corresponding to the critical pressure of the volatilizable components of the reaction mixture. For example, in the manufacture of sodium phenate from a mixture of chlorobenzene, caustic soda and water, to which reference has been already made, it is necessary to bring the temperature of the mixture under suitable pressure up to a satisfactory reaction point, for instance 320° C. at a pressure of 250 atmospheres. Steam at 400° C. under this pressure will contain approximately 264 kilogram calories more heat per kilogram than water at 320° C. and the same pressure. This heat is therefore available to raise the temperature of the reacting ingredients from their initial temperature to 320° C. Accordingly the percent by weight of the total mixture which must be added to the mixture in the form of steam at 400° C. is by proportion approximately 52 percent, when the initial temperature at which the reacting components are utilized is approximately room temperature. Similarly, it is seen by proportion that if the reaction mixture is preheated to 200° C., it will only be necessary to heat approximately 32 percent of the water to steam at 400° C. in order to bring the mixture to the desired reaction temperature.

In some cases the reaction mixture may be sufficiently mixed in mixing device 4, where it is brought into reactive relation at the proper temperature so that the reaction may pass immediately to substantial completion allowing the products of the reaction to be vented at once as at controlled outlet 15. If a longer time is required for the reaction to proceed, the mixture is then passed to a suitable reaction chamber, such as coil 8 or its equivalent, from whence it can be vented through controlled outlet 10 to a suitable receiver as previously disclosed.

It will be understood that the temperature to which the component heated in coil 2, or equivalent chamber is raised, is a higher temperature than that required for the reaction mixture. It will further be seen that this method of heating the reacting mixture in divided stream permits bringing the ingredients up to reacting temperature suddenly upon mixing and avoids bringing them together at lower temperatures, which in some cases has a disadvantageous effect upon the reaction, or the efficiency thereof. It is permissible in certain cases to heat one of the ingredients of a reacting mixture to a temperature considerably above that desired for the reaction but is is not permissible to heat other ingredients to a high temperature or to even the reaction temperature gradually. The present improved method therefore enables the absorption of the heat for the reaction temperature in that portion of the mixture which may be permissibly heated to a higher temperature than that to which it would be permissible or advantageous to heat the entire mixture, or other portions thereof, previous to reactive contact of the ingredients. The advantage of separate heating is also realized in avoiding attack of metallic apparatus which occurs at high temperatures due to the corrosive action of certain of the ingredients of reacting mixtures. Such ingredients in the herein disclosed method need be preheated to a moderate temperature only, thereby avoiding in part or altogether attack on metal surfaces of the apparatus consequent upon prolonged contact thereof with such corrosive ingredients at the higher temperature required for the chemical reaction.

Other modes of applying the principle of our invention may be employed instead of those explained, change being made as regards the methods herein disclosed, provided the step or steps stated by any of the following claims or the equivalent of such stated step or steps be employed.

We therefore particularly point out and distinctly claim as our invention:—

1. In a method for making a phenate, the steps which consist in preparing a mixture of a mono halogenated benzene and a water solution of a caustic alkali under pressure in excess of the vapor pressure to be later developed, but at a temperature below the temperature of reaction and then heating said mixture to the reaction temperature by injecting thereinto steam of a higher pressure superheated to a temperature in excess of the reaction temperature desired.

2. In a method for making a phenate, the steps which consist in preparing a mixture of monochlorbenzene and a water solution of sodium hydroxide under pressure in excess of the vapor pressure to be later developed, but at a temperature below the temperature of reaction and then heating said mixture to the reaction temperature by injecting thereinto steam of a higher pressure superheated to a temperature in excess of the reaction temperature desired.

3. In a method for making a phenate, the steps which consist in preparing a mixture of a halogenated benzene and a water solution of a caustic alkali under pressure in excess of the vapor pressure to be later developed, but at a temperature below the temperature of reaction and then heating said mixture to the reaction temperature by injecting thereinto steam of a higher pressure superheated to a temperature in excess of the reaction temperature desired.

4. In a method of making a hydroxy aromatic hydrocarbon, the steps which consist in heating under pressure a mixture of a halogenated aromatic hydrocarbon and an aqueous solution of a basic hydrolytic agent, and intermixing therewith while still under pressure, an additional aqueous component which has been superheated sufficiently to raise the mixture to the reaction temperature.

5. In a method of making sodium phenate, the steps which consist in preparing a mixture of monochlorobenzene and aqueous sodium hydroxide under pressure but at a temperature below 320° C., and then heating said mixture to substantially 320° C. by injecting thereinto steam of a higher pressure superheated above 320° C.

6. In a method of effecting a chemical reaction between an aqueous alkaline component and an aromatic compound capable of being hydrolyzed therewith to form a phenate by heating the same together under pressure, the steps which consist in mixing such alkali and aromatic compound, preheating the same to a temperature below the reaction temperature and injecting thereinto steam at a temperature and pressure sufficient to raise the resultant mixture to the reaction temperature.

7. In a method of effecting a chemical reaction between an aqueous alkaline component and an aromatic compound capable of being hydrolyzed therewith to form a phenate by heating the same together under pressure, the steps which consist in mixing such alkali and aromatic compound, preheating the same to a temperature below the reaction temperature and injecting thereinto steam superheated to a temperature above the desired reaction temperature in amount sufficient to raise the preheated mixture to the reaction temperature.

8. In a method of making a phenate, the steps which consist in preparing a mixture of a halogenated aromatic hydrocarbon and an aqeuous caustic alkali, preheating the same to a temperature below the reaction temperature and injecting thereinto steam at a temperature and pressure sufficient to raise the preheated mixture to the reaction temperature.

9. In a method of making sodium phenate, the steps which consist in preparing a mixture of monochlorobenzene and an aqueous sodium hydroxide solution, preheating the same to a temperature below the reaction temperature and injecting thereinto steam at a temperature and pressure sufficient to raise the preheated mixture to the reaction temperature.

JOHN J. GREBE.
WILLARD H. DOW.